Dec. 23, 1958          A. E. BISHOP          2,865,216
VARIABLE RATIO STEERING GEAR
Filed March 16, 1955          2 Sheets-Sheet 1
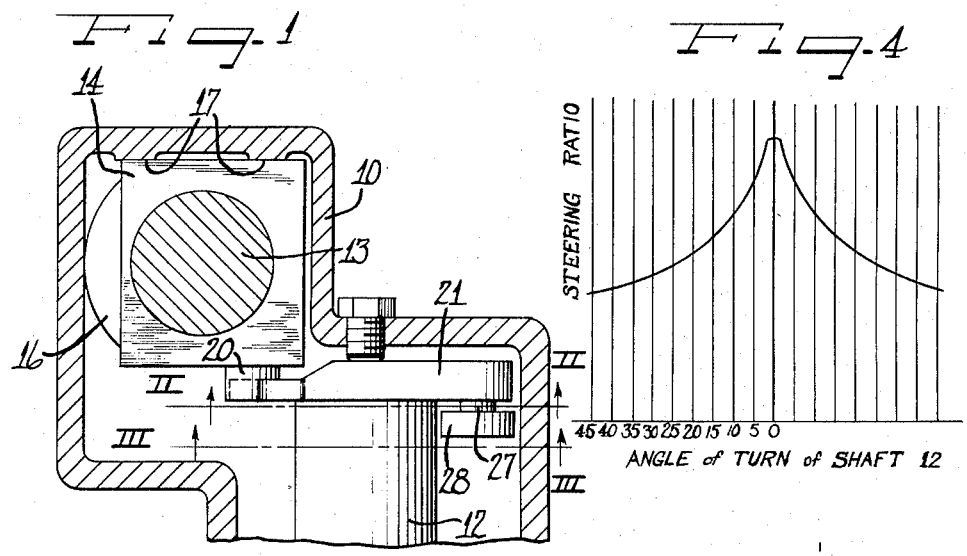
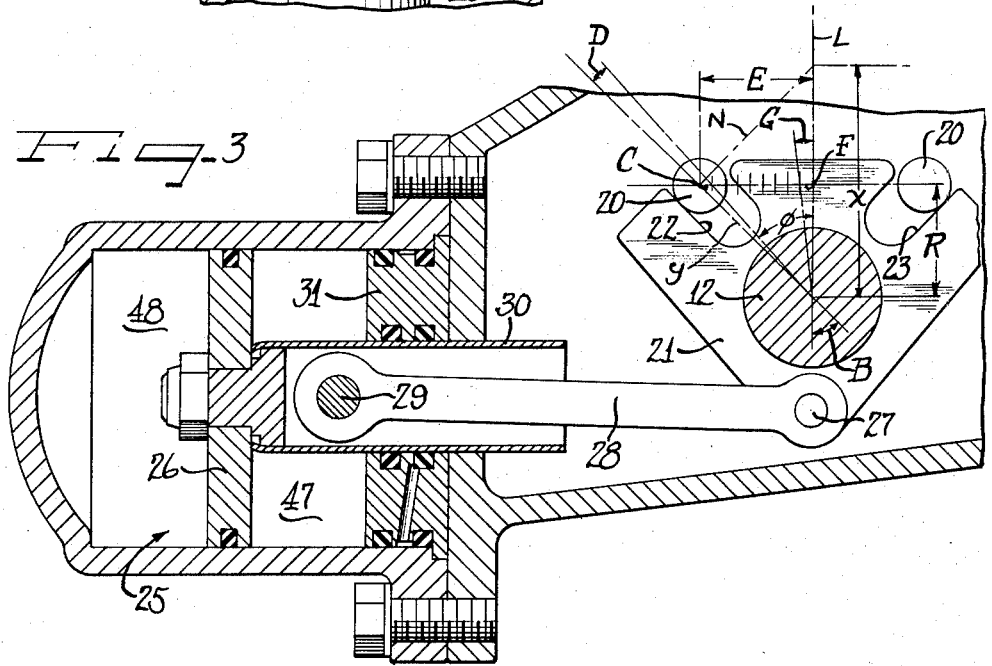
Inventor
Arthur E. Bishop

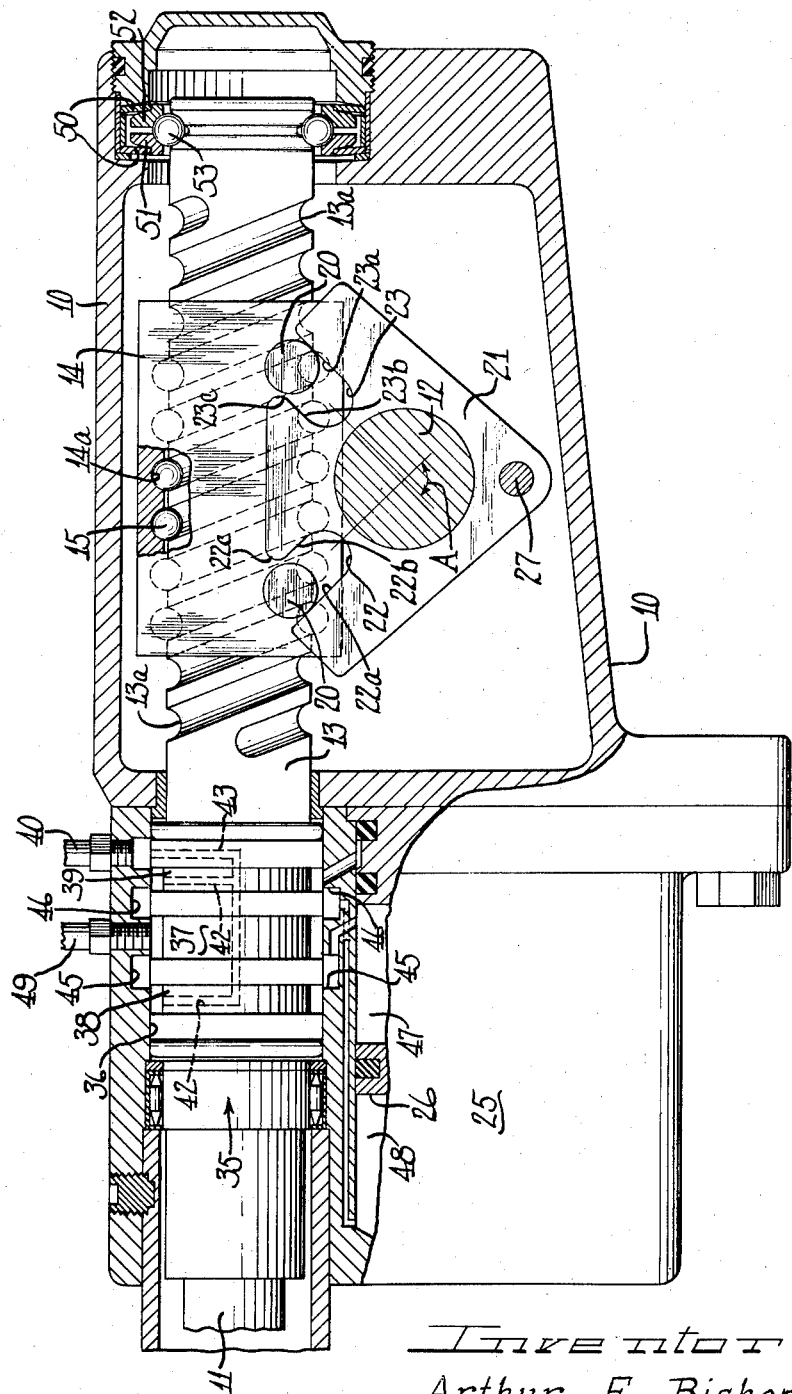

United States Patent Office 2,865,216
Patented Dec. 23, 1958

2,865,216
VARIABLE RATIO STEERING GEAR

Arthur E. Bishop, Chatswood, near Sydney, New South Wales, Australia

Application March 16, 1955, Serial No. 494,706

19 Claims. (Cl. 74—388)

The present invention relates to steering apparatus for vehicles and is more particularly concerned with the construction of a new and improved steering gear of the power boost type.

In recent years the use of power steering for conventional automotive vehicles has greatly increased. Where in prior years use of power steering devices had been limited mainly to heavy duty trucks and similar vehicles, recent developments in the common passenger vehicles have made power assisted steering increasingly desirable. For example, vehicle tire pressures have been substantially reduced and steering geometry has been revised, both changes having substantially increased the effort required to accomplish vehicle steering movement.

Numerous power steering systems have been devised for supplying the desired assistance. However, the systems commercially used at the present time have in most cases merely applied a power assist to a conventional steering gear arrangement wherein a very high gear reduction is employed. Such gear reductions commonly provide approximately five turns of the steering wheel for lock-to-lock steering movement of the vehicle wheels. This general ratio, which is in most cases identical to the manual steering ratio, obviously requires a large amount of steering wheel turning activity on the part of the average driver in parking and otherwise manipulating the vehicle in normal driving. Although it has been considered desirable in the automotive field to provide a power steering system wherein the steering ratio is reduced to permit fewer turns of the steering wheel from the extreme or lock-to-lock steered wheel turn, the industry has refused to accept the systems heretofore proposed since they provide unusually fast steering response at the high speed straight ahead steering position as well as in the parking position. Unfortunately it has been found that many drivers are unable to adapt themselves to the fast steering response under high speed straight ahead driving conditions and accordingly it is considered by many in the automotive industry to be unsafe to utilize low steering gear ratios with power steering in spite of the fact that such ratios are no longer necessary to provide adequate steering torques.

The present invention provides a steering system which permits a low lock-to-lock number of turns at the steering wheel but at the same time provides a high steering ratio in the straight ahead or normal highway driving condition. This is accomplished through the use of a variable steering gear ratio linkage whereby rotary motion imparted to the vehicle steering wheel is transformed into steering movement at the steered dirigible vehicle wheels with increasing directness as the steered wheels are turned away from the straight ahead condition. As a result of this arrangement the total number of steering wheel turns to provide lock-to-lock operation of the steered wheels is substantially reduced without changing the essential characteristics of the steering system in the ordinary high speed driving ranges. However, when parking, the very great advantages of low steering gear ratio and hence minimum steering wheel turn, are provided.

In accordance with the present invention, a steering gear of the recirculating ball type is provided wherein the ball nut, or reciprocating element, is provided with a pair of force transfer pins. These pins are mounted in association with a pair of diverging slots in a lever connected to the steering gear cross arm. As a result of the angularity of the slots, reciprocation of the ball nut will provide a change in effective lever arm, providing a decreasing lever arm between the ball nut and the cross shaft as the cross shaft moves further and further away from its center line or straight ahead position.

It is therefore an object of the present invention to provide a novel variable ratio steering gear.

Another object of the present invention is to provide a power steering system wherein a relatively high steering ratio is provided in the straight ahead driving condition and wherein that steering ratio is continuously variable to provide a low steering ratio at the extremities of vehicle turn.

A feature of the invention is the provision of a double pin-double slot cam connection between a reciprocating steering wheel-actuated, element and a rotary lever in turn actuating the dirigible wheels of a vehicle.

Another feature of the invention is the provision of a power cylinder operatively connected to a cross shaft through a substantially constant ratio connection and a steering wheel shaft connected to said cross shaft through a dual pin-dual slot cam connection wherein said slots are provided in a plate secured to said cross shaft and said pins are secured to a reciprocating nut driven by said steering shaft and are placed in driving connection in said slots.

Still a further object of the present invention is to provide a novel and improved power steering system for vehicles whereby power is utilized to decrease the number of steering wheel turns required to actuate the steered vehicle wheels without providing inordinately rapid steering in the straight ahead highway driving condition.

Still other and further objects and features of the present invention will at once become apparent to those skilled in the art from a consideration of the attached drawings wherein a preferred embodiment of the present invention is shown by way of illustration only, and wherein:

Figure 1 is an elevational view in cross-section of a steering column gear box incorporating the present invention;

Figure 2 is a plan view in cross-section taken along the line II—II of Figure 1;

Figure 3 is a plan view in cross-section taken along the line III—III of Figure 1; and Figure 4 is a graph illustrating the operation of the steering apparatus of the present invention.

As shown on the drawings:

As viewed in Figures 1, 2 and 3, the power steering apparatus of the present invention utilizes a generally conventionally shaped housing 10 which supports a steering wheel shaft 11, pitman, or cross, shaft 12, worm 13 and a recirculating ball nut 14. The recirculating ball nut 14 cooperates with the worm 13 in the conventional manner with recirculating balls 15 operating in a closed circulating loop formed by the worm grooves 13a in the worm 13, the nut grooves 14a in the nut and the circuit closing ball carrying tube 16. The recirculating ball nut is, as was stated above, a conventional structure in so far as its cooperation with the worm 13 is concerned and it will be understood that it is not, per se, considered a part of the present invention. Further, the present invention contemplates within its scope, the provision of a steering shaft and nut connection in which no anti-friction balls are provided should such a construction be considered economically desirable for certain uses requiring a minimum of expense.

The nut 14 may be prevented from rotation in any conventional manner but is so held in the structure illustrated by means of a pair of guideways 17 on the inside surface of the housing 10. As a result of this arrangement, rotation of the steering shaft 11 will cause an anti-friction reciprocating drive to be applied to the nut 14 in such a manner that the cam pins 20 provided on the nut 14 are reciprocated along a straight line path parallel to the axis of the shaft 11.

The cross shaft or pitman arm shaft 12 is provided with a cam 21 having slots 22 and 23 formed therein. Slots 22 and 23 are positioned for cooperation with the pins 20 and, as illustrated, are provided with axes forming an included angle A of 90°. While this degree of angularity of the slots 22 and 23 has proven quite satisfactory it will be understood that the slots 22 and 23 may lie at a somewhat different angle relative to each other within the scope of the present invention as will be explained below.

With the parts in the neutral condition, as shown in Figure 2, it will be seen that the pins 20 are in contact with the edges 22a and 23a of the slots 22 and 23, respectively. The opposite sides 22b and 23b of the slots 22 and 23 terminate at points 22c and 23c immediately adjacent to but not quite in contact with the surface of the associated pins 20. Accordingly, upon reciprocation of the nut 14 and the pins 20 in either direction, such as for example to the left as viewed in Figure 2, the left hand pin 20 will act against the slot wall 22a to rotate the cam 21 and the cross shaft 12 in the counterclockwise direction. After a slight initial movement resulting from contact of the left hand pin 20 with the slot wall 22a the right hand pin 20 will intercept the slot wall 23b and the wall 22a will completely separate from the left hand pin 20. As a result of the fact that the left hand pin 20 moves away from the cross shaft 12 as it moves toward the left in Figure 2, the slot wall 22b will not abut against the left hand pin 20 and accordingly the right hand pin 20 will pick up the drive connection with the slot wall 23b smoothly.

In view of the angularity of the slots 22 and 23 relative to each other the steering ratio, or ratio of the number of turns of the steering wheel to turns of the cross shaft 12, will decrease as the cross shaft travels from a neutral position to an extreme position of turn. Thus, for a constant increment of turn of the steering shaft and hence a constant increment of reciprocation of the nut 14 away from the neutral condition, the corresponding angle of rotation of the cross shaft 12 will increase.

This may be better understood where, for example, the angle of turn from neutral to an extreme turn position, indicated as B in Figure 3, is divided into nine equal increments as measured along the axis of the steering shaft 11. During the first increment of movement, indicated at C, the angle of turn D is 45° minus $\phi$ where tangent $\phi$ equals $$\frac{E \text{ minus } C}{R}$$

where E is the total linear movement from neutral to extreme turn position and R is the distance from the cross shaft 12 to the center line of the pins 20 along which the increments of movement of the nut 14 are measured. Using the increments above suggested, it will be found that for the first increment C a rotation of approximately 4.5°, or D equals 4.5° will occur while for continued, further, increments, the corresponding angle of turn substantially increases. Thus, for the last increment of turn F, the corresponding angle G will be found to approximate 8° and accordingly the steering ratio will be seen to have approximately halved.

Figure 4 illustrates graphically this change in ratio. As may be seen, as the cross shaft 12 moves away from its neutral condition in either direction the steering ratio drops rapidly from a high, straight ahead, ratio to a more gradually decreasing low ratio. As explained above, in view of the requirement that the points 22c and 23c on the cam 21 clear the pins 20, the first movement of the cam 21 in response to reciprocation of the nut 14 will occur as a result of contact of a respective pin 20 with the outer walls of the slot, 22a or 23a. Accordingly, at the outset of steering wheel turn the low ratio will be maintained for a few degrees.

The form of the rapid change in ratio, or variation in angular velocity of rotation of the output cross shaft 12 with constant reciprocation of members 20, above set forth, is also, of course, reflected in and may be observed in the changing distance from the axis of the shaft 12 to the point at which the line of instantaneous force contact or transfer (the conventionally termed "line of action" which passes through the contacting surfaces between the pin 20 and the contact head side wall of its respective slot 22 and also termed "the common normal" thereto), crosses the line of centers of the contacting rotary parts. In the present case where the pins 20 reciprocate and hence move in an arc of infinite radius, the line of centers is, of course, the line L which passes through the center of rotation of shaft 12 and is perpendicular to the path of reciprocation of pins 20. That the point at which the common normal or line of instantaneous force contact crosses this line of centers reflects the ratio of force transmission is universally recognized. If, for example, the line passes through the same point on the line of centers at all positions of the input and output members, the ratio of force transmission between the input and output members is constant. In the present case, however, it is obvious that the common normal, N, crosses the line L at a point at first rapidly approaching the axis of rotation of shaft 12 and then more gradually approaching it as the pin 20 moves incrementally toward the last increment G and, accordingly, the ratio, as above noted, drops from a high ratio to the low ratio rapidly at first and then more gradually.

In the minimum steering ratio situation, in which the output shaft 12 is in its extreme steering position just after the last increment of movement G, the above mentioned common normal N will, of course, coincide with the axis of reciprocation of the abutment pins 20 and the distance from the axis of shaft 12 to the point at which the normal N crosses the line of centers is R as shown. At the other extreme, or in the straight ahead maximum ratio condition shown in Figure 3, the common normal N is, being normal to the line y, at angle B, or 45°, relative to the axis of reciprocation and accordingly intersects the line of centers at a distance X from the axis of shaft 12 which distance equals 2R or $$\frac{R}{\cos^2 45°}$$

It is thus again confirmed that the velocity of rotation of the shaft 12 in the apparatus shown is essentially halved at the in-line condition, and the steering ratio, which is the ratio of velocity of reciprocation to the velocity of rotation, doubled. The plot of this changing ratio and the manner in which it changes rapidly at first and then less rapidly is, as above discussed, seen in Figure 4.

It will be understood that the angle A between the slots 22 and 23 may be varied and that such variations will produce a different rate of change in the steering ratio as the cross shaft 12 is turned. As the angle A is increased the decrease in steering ratio from the neutral to the extreme turn position will become more exaggerated and vice versa.

As a result of the fact that a high steering ratio was provided in the straight ahead position and a substantially lower steering ratio was provided in the extreme positions of turn, as above discussed, the lead on the worm 13 may be designed to provide a substantially conventional steering ratio in the straight ahead position. In view of the angled pin slot arrangement illustrated this lead may be substantially greater than ordinarily provided in worm and nut steering gear systems in which the connection between the worm and the worm follower remains of constant ratio and is positioned at a point on a line drawn through the axis of the cross shaft 12 perpendicular to the axis of the steering shaft 11.

In the gearing of the present system, when the parts are in this above described condition wherein the force contact takes place at a point on a line passing through the cross shaft 12 and perpendicular to the steering shaft 11, the lowest steering ratio will be provided, which ratio is substantially lower and hence substantially more direct in steering result, than in conventional systems. By using the high lead screw in combination with the cam connection above described, relatively few turns of the steering wheel are required to provide complete lock-to-lock steering operation, in spite of the fact that the steering ratio in the straight ahead position is substantially conventional.

The linkage described above will, of course, render manual steering of the system at the extreme points of turn rather difficult since the steering ratio will have been substantially reduced. It is preferred, therefore, that the present system be utilized in combination with a power boost apparatus such that the power is applied during sharp steering operations, such as parking and low speed turns, wherein a high angle of turn is contemplated. To this end, a power cylinder 25 is shown housed within the main housing 10. As may be seen from a consideration of Figures 1 and 3, a piston 26 is reciprocably mounted within the cylinder 25 and is drivingly connected to the cam 21 by means of a crank pin 27, a connecting link 28 and a piston pin 29. The piston 26 carries a sheet metal sleeve 30 which slides through the bulkhead 31. The connection between the sleeve 30 and the piston 26 provides, in combination with the bulkhead 31, a positively guided piston capable of transmitting motion to cross shaft 12 through a slightly non-linear linkage without canting the piston 26 in the cylinder 25.

Motive power is applied to the piston 26 under the control of the hydraulic valve comprising a valve spool 35 reciprocably mounted in a valve housing 36 forming a part of the housing 10. As may be seen from consideration of Figure 2, the spool 35 is provided with a centrally located groove 37 and a pair of exhaust grooves 38 and 39 vented to an exhaust conduit 40 by means of the bore 41, 42 and 43 shown in dotted lines. The housing 36 is provided with a pair of power cylinder grooves 45 and 46 ported to the chambers 47 and 48, respectively. Fluid under positive pressure is supplied via conduit 49 to the groove 37 and depending upon axial shift of the valve spool 35, the motive fluid is directed to chamber 47 or 48 at the same time the other of the chambers is vented to the exhaust conduit 40 via the bore 40 or 41.

The valve as above described is conventional and per se forms no part of the present invention. It will be understood that any valve under the influence of steering torque may be utilized satisfactorily with the structure of the present invention and the specific valve construction herein shown is for purposes of illustrating an operative construction only.

The valve spool 35 is caused to reciprocate by the reaction of the pins 20 on the cam 21. Upon the application of a steering load to the cross shaft 12, movement of the nut 14 will be resisted. This resistance will cause the shaft to reciprocate against the influence of the balanced Belleville springs 50 which provide, in combination with the bearing races 51 and 52, and the ball bearings 53, a rotary bearing support for the steering shaft which will permit limited axial movement of the shaft 11 upon the application of a steering load to the cross shaft 12. A complete description of the Belleville springs 50 and their association with the steering shaft 11, as well as their operation in the steering system is set forth in my copending application Serial No. 479,590, filed January 3, 1955, and accordingly further discussion is not deemed necessary at this point.

In operation, rotation of the steering shaft 11 will accordingly cause a rotational or steering movement of the shaft 12 through the variable ratio dual pin and slot arrangement above described until such time as a steering load is applied to the cross shaft 12 sufficient to cause a reaction force at the nut 14 capable of overpowering the springs 50. Upon deflection of the springs 50, the valve spool 35 will move to the left or right directing power to the piston 26 which will in turn provide a boost to the cam 21 through the pin 27. Thus, the high lead worm 13 and the substantially reduced steering ratio at the extreme positions of wheel turn are amply compensated for by the addition of the power supplied by the hydraulic motor. Accordingly, a substantial reduction in the number of turns required to steer the vehicle wheels from lock-to-lock positions has been accomplished, with resultant ease in steering, and without at the same time endangering the driver of the vehicle by providing a low steering ratio in the portion of normal straight ahead driving, and without adding to the steering force required of the driver at the steering wheel.

For purposes of interpreting and understanding the present specification and claims it will be understood that the terms "reciprocating," "reciprocable," "reciprocation," and/or "reciprocated" relate to back and forth motion of a non-pivotal generally linear nature as compared with oscillation of a part about a pivot axis in the manner of a pendulum or the like.

It will thus be clear that I have provided a novel and substantially improved steering system capable of providing the desired low number of steering wheel turns for effective steering and at the same time providing a high steering ratio at the straight ahead, high speed, highway driving condition.

It will be understood that variations and modifications can be made in the structure hereinabove set forth without departing from the scope of the novel concepts of the present invention and accordingly I do not intend to be limited other than as required by the appended claims.

I claim as my invention:

1. A steering system comprising a steering shaft, a high lead worm on said shaft, a nut engaged with said worm for reciprocation thereby, a pair of laterally projecting pins on said nut, a cross shaft for actuating a steered part and a cam on said cross shaft, said cam having a pair of slots therein positioned for cooperation with said pins, the axes of said slots lying radially in said cross shaft and forming an included angle the bisector of which lies perpendicular to the axis of said steering shaft when the steered part is in its neutral position.

2. A steering system comprising a steering shaft, a reciprocable member, means for reciprocating said member on rotation of said steering shaft, a pair of pins on said member, a rotary member connected to a steered part for steering actuation thereof and having its axis of rotation transverse to the axis of reciprocation of said reciprocable member, a pair of slots in said rotary member for cooperation with said pins, the axes of said slots lying at an angle to each other and the bisector of said angle lying perpendicular to the axis of said reciprocating member when the steered part is in its centered position.

3. A steering system comprising a steering shaft, a high lead worm on said shaft, a circulating ball nut surrounding said worm and reciprocated thereby, a pair of laterally projecting pins on said nut, a cross shaft for actuating a steered part, power means for actuating said steered part, a cam on said cross shaft separate from said power means and having a pair of slots therein for cooperation with said pins, the axes of said slots lying at an angle to each other the bisector of which lies perpendicular to the axis of said steering shaft when the steered part is in its neutral position, and a valve controlling said power means and actuated in response to steering motion of said steering shaft upon the application of resistance to movement of said steered part during steering action.

4. A steering system comprising a steering shaft, a high lead worm on said shaft, a circulating ball nut surrounding said worm and reciprocated thereby, a pair of laterally projecting pins on said nut, a cross shaft for actuating a steered part, power means for actuating said steered part, a cam on said cross shaft separate from said power means and having a pair of slots therein for cooperation with said pins, the axes of said slots lying radially of said cross shaft and forming an included angle the bisector of which lies perpendicular to the axis of said worm when the steered part is in its neutral position, and a valve controlling said power means and actuated in response to steering motion of said steering shaft upon the application of resistance to movement of said steered part during steering action.

5. A steering system comprising a steering shaft, a reciprocable member, means for reciprocating said member on rotation of said steering shaft, a pair of pins on said member, a rotary member connected to a steered part for steering actuation thereof and having its axis of rotation transverse to the axis of reciprocation of said reciprocable member, a pair of slots in said rotary member for cooperation with said pins, the axes of said slots lying radially of said cross shaft and having an included angle the bisector of which lies perpendicular to the axis of said reciprocable member when said steered part is in its centered position.

6. A variable ratio power steering system comprising a rotary steering shaft, means translating rotary motion of said steering shaft to reciprocation of a first member, a pair of pins projecting from said first member, a second member rotatable about an axis transverse to the axis of said first member, a pair of slots in said second member positioned in cooperation with said pins, the axes of said slots lying at an angle to each other and intersecting the axis of said second member with the bisector of said angle lying perpendicular to said axis of said first member when said second member is in its neutral position in which the vehicle being steered is in its straight ahead condition, and power means actuating said second member independently of said pin and slot connection upon rotation of said steering shaft against a steering load.

7. A variable ratio steering gear for vehicles or the like comprising a first reciprocating member actuated by rotation of a steering wheel and a second rotary member mounted for rotation about an axis transverse to the path of reciprocation of said first member, a pair of pins on said first member and a pair of slots on said second member cooperating with said pins, said slots being positioned on said second member such that their axes intersect the axis of said second member and lie at an angle to each other, the bisector of which angle lies perpendicular to the path of reciprocation of said first member when said second member is in a neutral high ratio force transmitting condition and the axis of a selected one of said slots lying perpendicular to the path of movement of said first member when said second member is in an extreme position of turn and is at its minimum force transmitting ratio.

8. A variable ratio steering gear for vehicles or the like comprising a first reciprocating member actuated by rotation of a steering wheel and a second rotary member mounted for rotation about an axis transverse to the path of reciprocation of said first member, a pair of pins on said first member and a pair of slots on said second member cooperating with said pins, said slots being positioned on said second member such that their axes intersect the axis of said second member and lie at an angle of 90° to each other, the bisector of which angle lies perpendicular to the path of reciprocation of said first member when said second member is in a neutral high ratio force transmitting condition and the axis of a selected one of said slots lying perpendicular to the path of movement of said first member when said second member is in an extreme position of turn and is at its minimum force transmitting ratio.

9. A variable ratio steering gear for vehicles or the like comprising a first reciprocating member actuated by rotation of a steering wheel and a second rotary member mounted for rotation about an axis transverse to the path of reciprocation of said first member, a pair of pins on said first member and a pair of slots on said second member cooperating with said pins, said slots being positioned on said second member such that their axes intersect the axis of said second member and lie at an angle of 90° to each other, the bisector of which angle lies perpendicular to the path of reciprocation of said first member when said second member is in a neutral high ratio force transmitting condition and the axis of a selected one of said slots lying perpendicular to the path of movement of said first member when said second member is in an extreme position of turn and is at its minimum force transmitting ratio and power motor means connected to said second member for rotation thereon in support of rotation by said pin and slot connection, said power motor means being actuated in response to rotation of said steering shaft against a load applied thereto at said means connecting said steering shaft to said first member.

10. A steering system comprising a steering shaft, a reciprocable member, means for reciprocating said member on rotation of said steering shaft, a pair of pins reciprocated by reciprocation of said member, a rotary member connected to a steered part for steering actuation thereof and having its axis of rotation transverse to the axis of reciprocation of said reciprocable member, a pair of slots in said rotary member for cooperation with said pins, the axes of said slots lying at an angle to each other and the bisector of said angle lying perpendicular to the axis of said reciprocating member when the steered part is in its centered position.

11. A variable ratio steering system comprising a rotatable steering shaft, a reciprocable member, means for reciprocating said member upon rotation of said steering shaft, a rotary member connected to a steered part for steering actuation thereof and having its axis of rotation transverse to the axis of reciprocation of said reciprocable member and variable ratio force transmitting elements on said members in positive interengaging contact with each other for translating reciprocal motion of said reciprocable member as it moves away from a centered position into rotary motion of said rotary member with variable ratio as said rotary member moves away from a centered position, said force transmitting elements comprising positive cam abutment means on said reciprocable member and positive cam abutment means on said rotary member projecting therefrom into positive cooperating interengagement with the abutment means on said reciprocable member and providing a shifting line of force contact between the abutment means that crosses the line of centers drawn through the axis of rotation perpendicular to the axis of reciprocation, at a point that moves rapidly toward the axis of rotation of the rotary member substantially immediately as the rotary member moves away from said center position in response to reciprocation of said reciprocable member.

12. A variable ratio steering system comprising a rotatable steering shaft, a reciprocable member, means for reciprocating said member upon rotation of said steering shaft, a rotary member mounted for rotation about an axis transverse to the path of reciprocation of the reciprocable member and connected to a steered part for steering actuation thereof and variable ratio force transmitting elements on said members in positive interengaging contact with each other for translating reciprocal motion of said reciprocable member as it moves away from a centered position into rotary motion of said rotary member with substantially increasing directness as said reciprocable member moves away from said centered position, said force transmitting elements comprising positive cam abutment means on said reciprocable member and positive cam abutment means on said rotary member projecting therefrom into positive cooperating interengagement with the abutment means on said reciprocable member providing a shifting point of force contact between the abutment means that moves rapidly toward the axis of rotation of the rotary member as the rotary member moves away from centered position for a portion of its travel in response to reciprocation of said reciprocable member away from centered position and continues to move further toward said axis at a less rapid rate as the rotary member continues to move further away from centered condition and toward an extreme condition.

13. A variable ratio steering system comprising a rotatable steering shaft, a reciprocable member, means for reciprocating said member upon rotation of said steering shaft, a rotary member connected to a steered part for steering actuation thereof and having its axis of rotation transverse to the axis of reciprocation of said reciprocable member and variable ratio force transmitting elements on said members in positive interengaging contact with each other for translating reciprocal motion of said reciprocable member as it moves away from a centered position into rotary motion of said rotary member with substantially increasing directness as said reciprocable member moves away from said centered position, the point of intersection of the normal to the point of force contact between said elements and a line drawn through the axis of rotation normal to the axis of reciprocation moving rapidly substantially closer to the axis of rotation of said rotary member substantially immediately as said reciprocable member moves in either direction away from its centered position, whereby the ratio of turns of the steering shaft to turns of the output shaft decreases substantially as said steering shaft is rotated away from a centered condition.

14. A variable ratio steering system comprising a rotatable steering shaft, a reciprocable member, means for reciprocating said member upon rotation of said steering shaft, a rotary member mounted for rotation about an axis transverse to the path of reciprocation of the reciprocable member and connected to a steered part for steering actuation thereof and variable ratio force transmitting elements on said members in positive interengaging contact with each other for translating reciprocal motion of said reciprocable member as it moves away from a centered position into rotary motion of said rotary member with substantially increasing directness as said reciprocable member moves away from said centered position, the line normal to the point of force contact between said elements rapidly moving substantially closer to the axis of rotation of said rotary member substantially immediately as said reciprocable member moves in either direction away from its centered position, whereby the ratio of turns of the steering shaft to turns of the output shaft decreases rapidly and substantially as said steering shaft is rotated away from a centered condition.

15. A steering system in accordance with claim 11 wherein a power motor is connected to said steered part for assisting steering actuation thereof and wherein means are provided for actuating said motor in response to the application of steering torque to said steering shaft.

16. A variable ratio steering system comprising a rotatable steering shaft, a reciprocable member, means for reciprocating said member upon rotation of said steering shaft, a rotary member connected to a steered part for steering actuation thereof and having its axis of rotation transverse to the axis of reciprocation of said reciprocable member and variable ratio force transmitting elements on said members in positive interengaging contact with each other for translating reciprocal motion of said reciprocable member as it moves away from a centered position into rotary motion of said rotary member with rapidly increasing directness as said reciprocable member moves away from said centered position, said force transmitting elements comprising positive cam abutment means on said reciprocable member and positive cam abutment means on said rotary member projecting therefrom into positive cooperating interengagement with the abutment means on said reciprocable member providing a shifting point of force contact between the abutment means the normal to which moves rapidly toward the axis of rotation of the rotary member as the reciprocable member moves away from centered position in response to rotation of the steering shaft and then moves more gradually toward the axis of rotation on continued rotation of the steering shaft.

17. A variable ratio steering system comprising a rotatable steering shaft, a reciprocable member, means for reciprocating said member upon rotation of said steering shaft, a rotary member connected to a steered part for steering actuation thereof and having its axis of rotation transverse to the axis of reciprocation of said reciprocable member and variable ratio force transmitting elements on said members in positive interengaging contact with each other for translating reciprocal motion of said reciprocable member as it moves away from a centered position into rotary motion of said rotary member with rapidly increasing directness as said reciprocable member moves away from said centered position and with a decrease in the rate of increase in directness subsequent to the initiation of the rapid increase in directness as the reciprocable member continues to move further away from said centered position, said force transmitting elements comprising positive cam abutment means on said reciprocable member and positive cam abutment means on said rotary member projecting therefrom into positive cooperating interengagement with the abutment means on said reciprocable member and providing a shifting point of force contact between the abutment means that moves rapidly toward the axis of rotation on the rotary member as the reciprocable member moves away from centered position for a portion of its said travel in response to rotation of said steering shaft and continues to move further toward said axis at a less rapid rate as the reciprocable member continues to move further away from centered condition.

18. A variable ratio steering system comprising a rotatable steering shaft, a reciprocable member, means for reciprocating said member upon rotation of said steering shaft, a rotary member connected to a steered part for steering actuation thereof and having its axis of rotation transverse to the axis of reciprocation of said reciprocable member and variable ratio force transmitting elements on said members in positive interengaging contact with each other for translating reciprocal motion of said reciprocable member as it moves away from a centered position into rotary motion of said rotary member with rapidly increasing directness as said reciprocable member moves away from said centered position, and with a gradually and smoothly decreasing rate of increase in directness subsequent to the initiation of the rapid increase in directness as the reciprocable member continues to move further away from centered position, said force transmitting elements comprising positive cam abutment means on said reciprocable member and positive cam abutment means on said rotary member projecting therefrom into positive cooperating interengagement with the abutment means on said reciprocable member and providing a shifting point of force contact between the abutment means the normal to which intersects the line of centers drawn through the axis of rotation perpendicular to the axis of reciprocation at a point that moves rapidly toward the axis of rotation of the rotary member as the reciprocable member moves away from centered position for a portion of its said travel in response to rotation of said steering shaft and continues to move further toward said axis at a gradually less rapid rate as the reciprocable member continues to move further away from centered condition toward its extreme of movement.

19. A variable ratio power steering system comprising a manual steering shaft, a reciprocable member, means for reciprocating said member on rotation of said steering shaft, a pair of cam elements on said member, a rotary member connected to a steered part for steering actuation thereof and having its axis of rotation transverse to the axis of reciprocation of said reciprocable member, a pair of slots in said rotary member for force contact cooperation with said cam elements, the axes of said slots lying at an angle to each other and the bisector of said angle lying perpendicular to the axis of said reciprocating member when the steered part is in its centered position, the normal to the point of force transfer between said slots and said cam elements crossing the line of centers passing through the axis of rotation perpendicular to the axis of reciprocation at a point rapidly moving toward the axis of rotation as the rotary member moves a small portion of its travel in either direction away from a centered condition.

References Cited in the file of this patent

UNITED STATES PATENTS

| | | |
|---|---|---|
| 876,994 | Persson | Jan. 21, 1908 |
| 904,137 | Mack | Nov. 17, 1908 |
| 923,230 | Wilt | June 1, 1909 |
| 2,508,057 | Bishop | May 16, 1950 |
| 2,589,940 | Hayek | Mar. 18, 1952 |
| 2,688,258 | Haynes et al. | Sept. 7, 1954 |